United States Patent
Ahm

(10) Patent No.: US 8,061,078 B2
(45) Date of Patent: Nov. 22, 2011

(54) GERMINATING UNIT AS WELL AS A SEED TAPE INCLUDING SEVERAL OF SUCH GERMINATING UNITS SUCCESSIVELY ARRANGED

(75) Inventor: Poul Henrik Ahm, Altea (ES)

(73) Assignee: Bentle Products AG, Baar (CH)

( * ) Notice: Subject to any disclaimer, the term of this patent is extended or adjusted under 35 U.S.C. 154(b) by 296 days.

(21) Appl. No.: 12/085,916

(22) PCT Filed: Dec. 6, 2006

(86) PCT No.: PCT/DK2006/000691
§ 371 (c)(1),
(2), (4) Date: May 30, 2008

(87) PCT Pub. No.: WO2007/065436
PCT Pub. Date: Jun. 14, 2007

(65) Prior Publication Data
US 2009/0173001 A1  Jul. 9, 2009

(30) Foreign Application Priority Data
Dec. 6, 2005  (DK) .................................. 2005 01727

(51) Int. Cl.
*A01C 1/04* (2006.01)
(52) U.S. Cl. .......................................................... 47/56
(58) Field of Classification Search .................. 47/56
See application file for complete search history.

(56) References Cited

U.S. PATENT DOCUMENTS

| | | | | |
|---|---|---|---|---|
| 2,338,103 | A  * | 1/1944 | Fischer | 47/56 |
| 3,623,266 | A  * | 11/1971 | Nakayama | 47/56 |
| 7,213,366 | B1 * | 5/2007 | Ahm | 47/56 |
| 2002/0189514 | A1 | 12/2002 | Onodera et al. | |
| 2003/0000140 | A1* | 1/2003 | Ahm | 47/56 |
| 2005/0268546 | A1* | 12/2005 | Ahm | 47/56 |
| 2006/0156623 | A1* | 7/2006 | Ahm | 47/56 |
| 2006/0162248 | A1* | 7/2006 | Ahm | 47/56 |
| 2009/0173001 | A1* | 7/2009 | Ahm | 47/56 |

FOREIGN PATENT DOCUMENTS

| | | |
|---|---|---|
| EP | 1230833 | 8/2002 |
| GB | 605799 | 7/1948 |
| GB | 2064934 A * | 6/1981 |
| WO | 2004028237 | 4/2004 |

\* cited by examiner

*Primary Examiner* — Frank T Palo
(74) *Attorney, Agent, or Firm* — Cooper & Dunham LLP

(57) ABSTRACT

A germinating unit (1) includes at least one seed (3) as well as additives. The germinating unit includes a carrier material (2) penetrable by a root tip (4) and/or a sprout (5) extending from the seed. The carrier material (2) can fix the orientation of the seed. Several germinating units can be joined to form a seed tape (6). The seed tape includes a longitudinal tissue (7). The carrier material portions (2a, 2b, 2c) cover or include their respective seed(s) (3a, 3b, 3c). When the seed(s) have been inserted in the carrier material through a cut in said carrier material or through insertion of a tube therein, said seed(s) maintain(s) its/their position relative to the germinating unit because said carrier material squeezes about or retains said seed(s).

14 Claims, 3 Drawing Sheets

Figure 1:
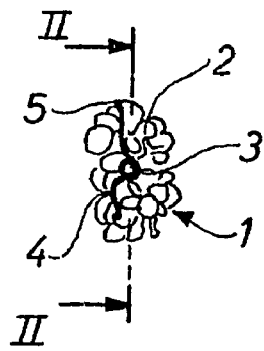

GERMINATING UNIT AS WELL AS A SEED TAPE INCLUDING SEVERAL OF SUCH GERMINATING UNITS SUCCESSIVELY ARRANGED

The invention relates to a germinating unit of the type including at least one seed as well as optional additives, such as nutrients and fillers, and a carrier material penetrable by a root tip and/or a sprout extending from the seed, said carrier material being suited for fixing the orientation of said seed.

In connection with mechanical sowing of germinating units it is difficult to ensure that the germinated seeds (contained in said units) are correctly positioned relative to the remaining germinating unit when the latter is placed in the ground.

EP 1230833 A2 discloses a germinating unit including at least one seed as well as optionally additives, such as nutrients and fillers. The germinating unit includes a carrier material penetrable by a root tip and/or a sprout extending from the seed, said carrier material being suited for fixing the orientation of said seed. This germinating unit is rather complicated and weak because it is provided with four or five big punched holes.

The object of the invention is to provide is to provide a germinating unit of the above type and which can ensure in a manner more reliable than hitherto known that the individual seeds can remain relatively accurately positioned or oriented relative to the germinating unit both prior to and after the germinating process has taken place. Further the germinating unit should not contain any artificial (punched) holes.

The germinating unit according to the invention is characterised in that the seed(s) used has/have been subjected to a pre-treatment in the form of pilling or film coating and that the carrier material presents a coherent structure with open cells communicating with one another. When the seed(s) has/have been correctly positioned in the germinating unit through a cut in the carrier material or by a tube being inserted in said carrier material, said seed(s) will maintain its/their position relative to said germinating unit because the carrier material has—due to its open cells—a fixing effect on said seed(s), for instance by squeezing said seed(s). When each seed forms a root tip and a sprout, viz. a stem, during the germinating process, these parts penetrate the carrier material with the result that they stabilize the position of said seed relative to the germinating unit. It is very important that the germinating unit presents the same orientation, viz. up and down direction during the later bedding in the ground as while it is subjected to the germinating process.

According to the invention, the seed(s) used may have been subjected to priming, viz. a germination. In this manner it is possible to utilize the germinating unit in a particularly efficient manner.

In addition, the carrier material may according to the invention be formed by a fibre-like material, preferably a collection of cellulose fibres made coherent for instance by way of gluing and/or a heat treatment. The resulting carrier material can in this case in a particularly efficient manner retain the seed(s) in its/their position(s) because the root tip and the sprout extending from each seed can penetrate the carrier material relatively easily between the fibres of said carrier material.

The invention relates also to a seed tape comprising a plurality of successively arranged germinating units, said seed tape being suited for a treatment allowing a controlled germination of the seeds, the carrier material portions of the germinating units being kept together by means of a longitudinal tissue made of a degradable material; this seed tape is characterised in that the longitudinal tissue is formed by in-elastic gauze presenting a net structure where the openings of the net have a main dimension of at least approximately 1 mm, and in that each carrier portion includes an air volume of at least 25% of the volume of said carrier material, while water can fill at least 60% of the volume of said carrier material. The resulting seed tape is very reliable and furthermore easy to handle in connection with the bedding out in the ground of said seed tape after the germination of the seed(s). In addition, this seed tape is relatively inexpensive to produce. Finally it is rather strong as it is not necessary to provide the seed tape—and the individual germinating units—with a big number of perforations.

According to the invention, the longitudinal gauze can be relatively narrow so as to form one or more string-like connecting parts. As a result the amount of polluted material originating from the seed tape is significantly reduced.

Moreover according to the invention, each carrier material portion may be placed in a bag whereby the bag material and the carrier material can be relatively weak and of the same type preferably presenting many weakened areas allowing said root tips and/or sprouts to project out of the seed tape. In this manner the root tip and the sprout, viz. stem, of each seed can especially easy penetrate the side wall of the bag in a weakened area.

According to the invention, each bag may at the top and at the bottom be partially closed by means of punctured welding seams in such a manner that the root tips and/or the sprouts of the seeds can easily pass said welding seams so as to project through the germinating unit.

Moreover, the carrier material of each seed or group of seeds may according to the invention be formed by a length of absorbing material arranged on the longitudinal gauze, said absorbing material being a length of blotting paper fastened by being glued to said longitudinal gauze, the blotting paper preferably including a wood fibre mass presenting an absorptive capacity of at least 50 g of water/$m^2$ per second. In this manner it is obtained in a very simple manner that each seed, optionally each group of seeds, can be kept against the longitudinal gauze.

According to the invention, the seed tape may have a width b of max. 30 mm, whereby each length of blotting paper may have a substantially corresponding width, while as far as the length L of each blotting paper is concerned, the following applies 8 mm<L<35 mm. These dimensions of the seed tape turned out to provide the optimum conditions for said seed tape.

Furthermore, in said lengths of blotting paper may according to the invention molars, bentonite or the like material be deposited, for instance absorbed, said nutrients and biocontrol organisms (BCO), such as Trichoderma, Seudonomas; Thuringiensis and the like organisms may optionally also be deposited, for instance absorbed in said lengths of blotting paper. As a result, an efficient depositing of additives in form of for instance nutrients etc. adjacent the seed(s) is obtained in a particularly simple manner.

The additives may according to the invention alternatively be deposited within a well-defined area, such as in the form of a tablet.

Finally according to the invention, the gauze tissue or the string-like connecting parts may have such a thickness that the individual germinating units can be cut off the seed tape by means of a knife or a hot wire, preferably a platinum wire. As a result, when the germinating units are to be bedded out in the ground, these germinating units can be separated from the seed tape in a very efficient manner.

Figure 2:
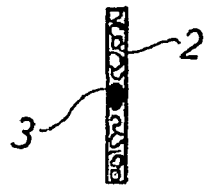
Figure 3:
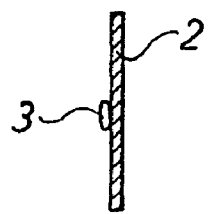
Figure 4:
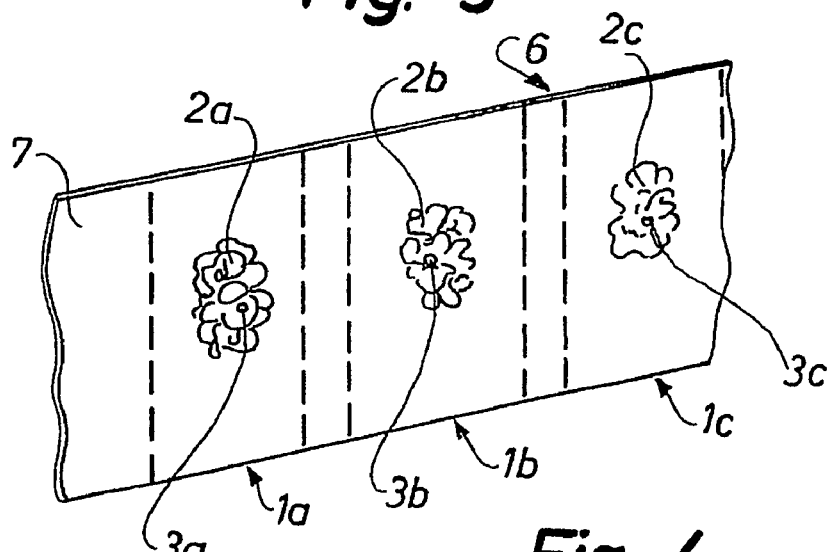
Figure 5:
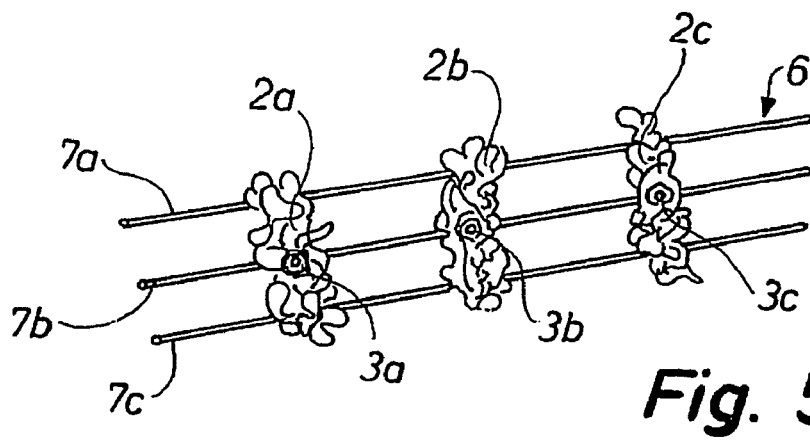
Figure 6:
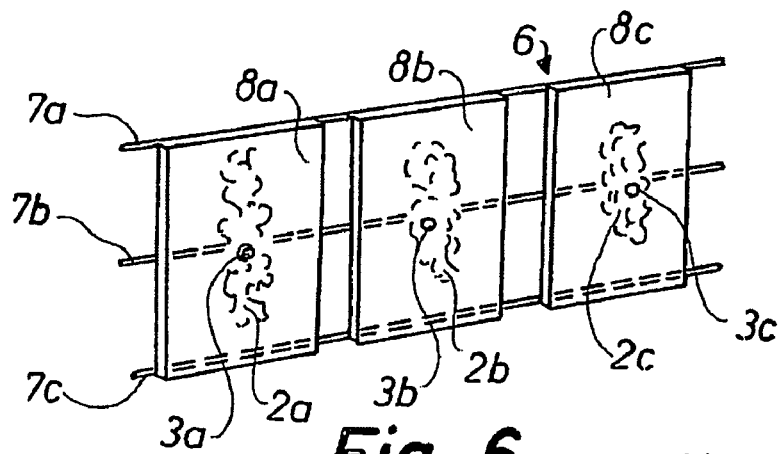
Figure 7:
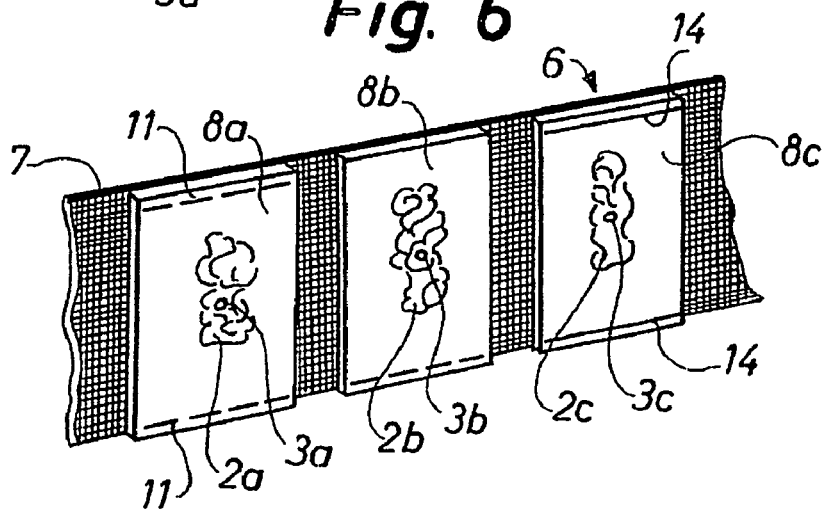
Figure 8:
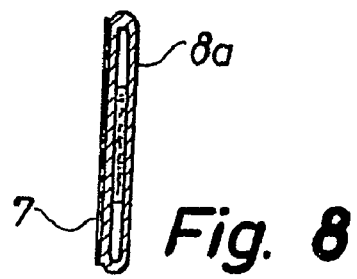
Figure 9:
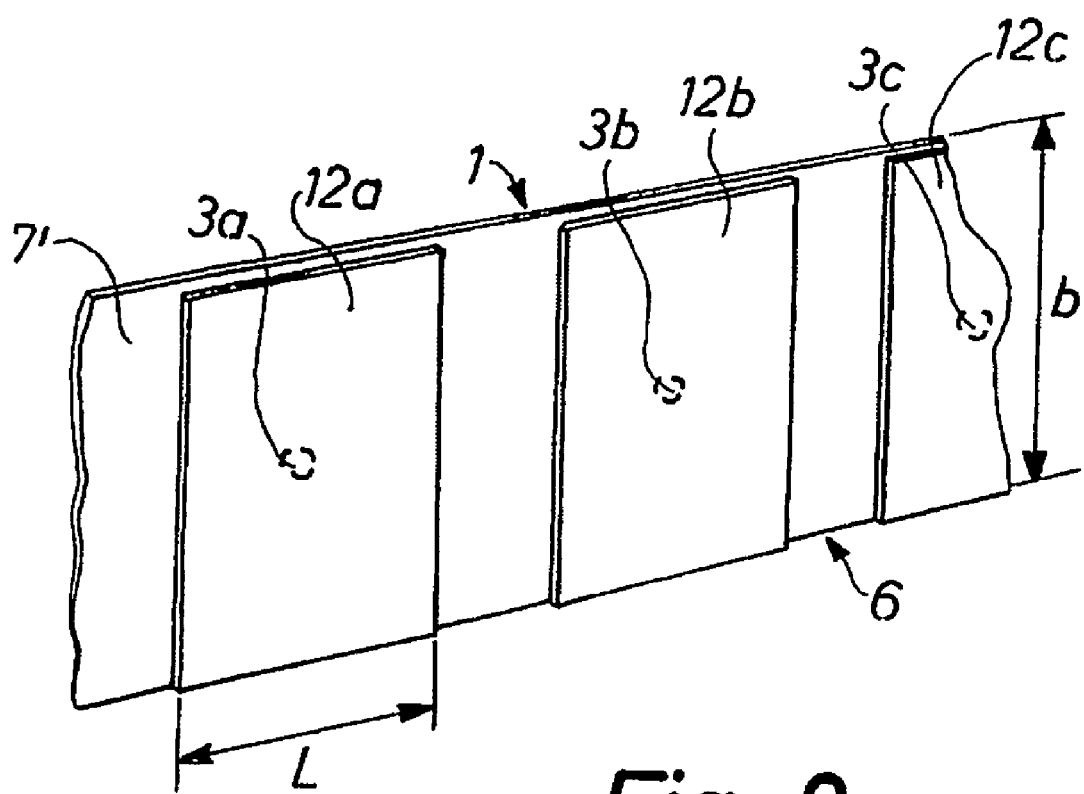

The invention is explained in greater detail below with reference to the accompanying drawing, in which FIG. 1 is a side view of an embodiment of a germinating unit according to the invention, FIG. 2 is a cross-sectional view of the germinating unit of FIG. 1, FIG. 3 shows a second embodiment of a germinating unit according to the invention, where the carrier material is formed by a collection of cellulose fibres, such as a length of blotting paper, FIG. 4 is an inclined side view of an embodiment of a seed tape according to the invention, FIG. 5 is a perspective view of a second embodiment of a seed tape according to the invention, where the longitudinal tissue is in form of three string-like connecting parts, FIG. 6 is a perspective view of yet another embodiment of the seed tape according to the invention, where each carrier material portion is inserted in a bag, FIG. 7 is a perspective view of an embodiment of the seed tape, where the bags including seeds and carrier material are arranged on a longitudinal tissue of a gauze-like nature, FIG. 8 is a vertical cross sectional view of the seed tape of FIG. 7, and FIG. 9 shows yet another embodiment of the seed tape, where the carrier material is formed by lengths of blotting paper.

FIG. 1 shows a germinating unit 1 including a carrier material 2 and a seed 3 inserted in said carrier material. The carrier material 1 can be penetrated by a root tip 4 and/or a sprout 5 extending from the seed 3. The root tip 4 and/or the sprout 5 assist in fixing the orientation of the seed relative to the carrier material 2 during a germinating process. The root tip 4 develops automatically substantially vertically downwards while the sprout 5 develops automatically substantially vertically upwards. When the germinating unit 1 has germinated it is important that its orientation is maintained because a change of the growing direction of the root tip 4 and/or of the sprout 5 at this time requires much energy from the seed in case the orientation of the germinating unit is changed. A further consequence is that the completely developed plant originating from such a seed is smaller and/or weaker than necessary.

The seed(s) 3 can be pre-treated, such as for instance subjected to a pilling or a film-coating, and it can also be subjected to a priming, viz. a pre-sprouting.

The carrier material 2 can be penetrated by the root tips 4 and the sprouts 5 extending from the seeds, and this carrier material presents preferably a coherent structure and includes preferably cells (not shown) communicating with one another. The carrier material 2 can be formed by a fibre-like material and for instance include a collection of cellulose fibres made coherent. The presently described germinating unit appears from FIG. 3.

FIG. 4 shows how the above germinating units can form part of a seed tape 6 according to the invention. This seed tape can be subjected to a treatment resulting in a controlled germination of all the seeds in the tape. The seed tape includes at least one longitudinal tissue 7 preferably made of material degradable in the ground, such as cotton. Carrier material portions 2a, 2b, 2c are arranged at regular intervals on the longitudinal tissue 7, said carrier material portions 2a, 2b, 2c including seeds 3a etc. thus kept together by means of said longitudinal tissue 7.

The longitudinal tissue can be divided into several relatively narrow tissue lengths, optionally in form of one or more string-like connecting parts 7a, 7b, 7c, cf. FIG. 5. One or more seeds is/are placed in each carrier material portion. FIG. 5 only shows one seed in each carrier material portion. Thus a seed 3a is placed in the carrier material portion 2a, a seed 3b in the carrier material portion 2b, etc.

The carrier material portions 2a, 2b, 2c, etc. including their respective seed(s) can be inserted in their respective bag 8a, 8b, 8c, cf. FIG. 6. The carrier material 2a, 2b, 2c and the material in the bags 8a, 8b, 8c can be of the same type preferably presenting many weakened areas (not shown) allowing the root tips 4 and/or the sprouts 5 of the seeds to project through the seed tape.

The bags 8a, 8b, 8c etc. can optionally be secured on a longitudinal tissue 7' of an inelastic gauze, preferably gauze presenting a net structure where the openings of the net have a main dimension of at least approximately 1 mm, preferably however 2 mm or more.

As shown at the top of FIG. 7, each bag 8a may at the top and/or at the bottom be partially closed by means of punctured welding seams 11 in such a manner that the root tips 4 and/or the sprouts 5 of the seeds can pass the seam 11. However, as shown at 14, each welding seam can also be solid in such a manner that each bag 8c is completed closed. Then care has been taken that each root tip and/or each sprout can penetrate through locally weakened areas in the wall material of the bag 8c. FIG. 7 shows several ways of closing the bags. This Figure has only been included for the sake of the present explanation. In practice, all the bags of the seed tape are formed as the bag 8a or all the bags are formed as the bag 8b. All the bags can also be shaped as the bag 8c or have another form.

Each carrier material portion, such as the carrier material portion 2a of FIG. 5 or 6, includes an air volume of at least 25% of the volume of the carrier material 2a while water can fill at least 60% of the volume of said carrier material.

The carrier material of each seed 3 or each group of seeds can optionally be formed by a length of absorbing material secured to a longitudinal tissue 7, such length of absorbing material for instance being a length of blotting paper 12a, 12b, 12c, cf. FIG. 9. Then each seed 3a, 3b, 3c is positioned between the longitudinal tissue 7 and each length of blotting paper 12a, 12b, 12c etc.

In the latter case, additives, such as nutrients and fillers can be completely or partially absorbed in the lengths of blotting paper.

The additives can alternatively be deposited within a well-defined area, such as in form of a tablet (not shown).

The used blotting paper 12a, 12b, 12c can for instance also include wood fibre mass presenting an absorptive capacity of at least 50 g of $H_2O/m^2$ per second.

In connection with FIG. 9 it should be noted that the illustrated seed tape 1 presents usually a maximum width of approximately 30 mm while each length of blotting paper 12a, 12b, 12c presents substantially the same width. As far as the length L of each length of blotting paper 12a, 12b, 12c is concerned, the following applies: 8 mm<L<35 mm.

Molars, bentonite or the like material can be deposited, for instance absorbed in the lengths of blotting paper 12a, 12b, 12c. Also nutrients and biocontrol organisms (BCO), such as Trichoderma, Seudonomas and Thuringiensis or the like organisms can be absorbed in these lengths of blotting paper.

The longitudinal tissue 7 can for instance be made of gauze, and it should be noted in connection with said longitudinal tissue or the string-like connecting parts 7a, 7b, 7c etc, that these members can have such a thickness that the individual germinating units can be cut off the seed tape by means of a knife (not shown) or hot wires, preferably platinum wires.

The invention can be modified in many ways without thereby deviating from the scope of the invention.

The invention claimed is:

1. A seed germinating unit comprising:
   a seed carrier material;
   at least one seed positioned within said seed carrier material through an opening formed therein, said seed carrier material being adapted to squeeze said seed within said carrier material to assist fixing the orientation of said seed therein prior to and during germination, said seed carrier material being penetrable by a root or sprout germinating from said seed upon said seed having been subjected to a pre-treatment in the form of a pilling or film-coating, and wherein the carrier material presents a coherent structure.

2. A germinating unit according to claim 1, wherein the at least one seed has been subjected to a priming, viz a germination.

3. A germinating unit according to claim 1, wherein the carrier material is formed by a fibre-like material, preferably a collection of cellulose fibres made coherent for instance by way of gluing and/or a heat treatment.

4. A seed tape suited for a treatment allowing a controlled germination of the seeds comprising:
   a plurality of successively arranged germinating units comprising,
      at least one seed,
      optional additives such as nutrients and fillers,
      a carrier material penetrable by a root tip and/or a sprout extending from said at least one seed and adapted to squeeze said at least one seed within said carrier material to assist fixing the orientation of said seed therein when said at least one seed has been positioned within the carrier material through an opening formed therein, said at least one seed having been subjected to a pre-treatment in the form of a pilling or film-coating, and wherein the carrier material presents a coherent structure the carrier material portions of the germinating units being kept together by use of a longitudinal tissue, preferably made of a degradable material, wherein the longitudinal tissue is formed by inelastic longitudinal gauze presenting a net structure, where openings of the net have a main dimension of at least approximately 1 mm and each carrier material portion includes an air volume of at least 25% of the volume of said carrier material while water can fill at least 60% of the volume of said carrier material.

5. A seed tape as recited in claim 4, wherein the longitudinal tissue is relatively narrow so as to form one or more string-like connecting parts.

6. A seed tape as recited in claim 5, wherein the gauze tissue or the string-like connecting parts have such a thickness that the individual germinating units can be cut off the seed tape by use of a knife or a hot wire, preferably a platinum wire.

7. A seed tape as recited in claim 5, wherein each carrier material portion is placed in a bag, and the bag material and the carrier material are relatively weak and of the same type, preferably presenting many weakened areas allowing the root tips and/or the sprouts of the seeds to project out of the seed tape.

8. A seed tape as recited in claim 4 wherein each carrier material portion is placed in a bag, and the bag material and the carrier material are relatively weak and of the same type, preferably presenting many weakened areas allowing the root tips and/or the sprouts of the seeds to project out of the seed tape.

9. A seed tape as recited in claim 8 wherein each bag at a top and at a bottom is partially closed by use of punctured welding seams in such a manner that the root tips and/or the sprouts of the seeds can easily pass said welding seams.

10. A seed tap as recited in claim 4, wherein the carrier material of each seed or group of seeds is formed by a length of absorbing material arranged on the longitudinal gauze, said absorbing material being a length of blotting paper by being glued, to said longitudinal gauze, said blotting paper comprising wood fibre mass presenting an absorptive capacity of at least 50 g of water/m$^2$ per second.

11. A seed tape as recited in claim 10 wherein it presents width b of maximum 30 mm, and that each length of blotting paper presents substantially the same width while as far as the length L of each length of blotting paper is concerned, the following applies: 8 mm<L<35 mm.

12. A seed tape as recited in claim 11, wherein molars, bentonite or the like material are deposited, for instance absorbed, in the lengths of blotting paper, and that nutrients and biocontrol organisms (BCO), such as Trichoderma, Seudonomas and Thuringiensis are optionally also deposited, for instance absorbed, in said lengths of blotting paper.

13. A seed tape as recited in claim 10, wherein molars, bentonite or the like material are deposited, for instance absorbed, in the lengths of blotting paper, and that nutrients and biocontrol organisms (BCO), such as Trichoderma, Seudonomas and Thuringiensis are optionally also deposited, for instance absorbed, in said lengths of blotting paper.

14. A seed tape as recited in claim 4, wherein the additives are deposited within a well-defined area, such as in form of a tablet.

* * * * *